United States Patent [19]

Kim

[11] Patent Number: 5,636,077
[45] Date of Patent: Jun. 3, 1997

[54] AUTOMATIC POWER-SAVING CIRCUIT FOR VIDEO RECORDING/REPRODUCING APPARATUS

[75] Inventor: Hyo-sung Kim, Seoul, Rep. of Korea

[73] Assignee: Samsung Electronics Co., Ltd., Kyungki-do, Rep. of Korea

[21] Appl. No.: 414,116

[22] Filed: Mar. 31, 1995

[30] Foreign Application Priority Data

Mar. 31, 1994 [KR] Rep. of Korea .......................... 94-6811

[51] Int. Cl.$^6$ .................................................... G11B 15/18
[52] U.S. Cl. .................................. 360/69; 360/74.4; 386/46
[58] Field of Search ........................... 360/69, 60, 33.1, 360/74.1, 74.4, 71; 358/335; 369/6, 7; 386/46

[56] References Cited

U.S. PATENT DOCUMENTS

| 4,317,189 | 2/1982 | Fukuoka | 369/7 |
| 4,319,286 | 3/1982 | Hanpachern | 360/33.1 |
| 4,717,968 | 1/1988 | Painton et al. | 360/69 |
| 4,991,025 | 2/1991 | Eigeldinger | 360/33.1 |
| 5,138,464 | 8/1992 | Park | 360/33.1 |

FOREIGN PATENT DOCUMENTS

| 107925 | 6/1985 | Japan | 369/6 |

*Primary Examiner*—Aristotelis Psitos
*Assistant Examiner*—Alan Faber
*Attorney, Agent, or Firm*—Sughrue, Mion, Zinn, Macpeak & Seas

[57] ABSTRACT

In a video recording/reproducing apparatus, an automatic power-saving circuit determines the existence of an input video signal and controls recording/reproducing functions accordingly, whereby recording/reproducing functions continue if an input video signal is present, and, if no video signal exists and no function key is input for a predetermined period of time, the recording/reproducing actions are halted and power is automatically cut-off.

10 Claims, 3 Drawing Sheets

AUTOMATIC POWER-SAVING CIRCUIT FOR VIDEO RECORDING/REPRODUCING APPARATUS

BACKGROUND OF THE INVENTION

The present invention relates to an automatic power-saving circuit for a video recording/reproducing apparatus. More particularly, it relates to an automatic power-saving circuit for halting a recording or reproducing operation and automatically cutting-off power when no input video signal is present and no function key has been depressed for a predetermined amount of time.

Generally, when a video signal is reproduced from a recording medium by a video recording/reproducing apparatus for home use, such as a videocassette recorder or camcorder, the apparatus reads out information written to the recording medium through a pickup, and then outputs a video signal after processing the information in a video signal processor. In the case of recording a video signal onto a recording medium, a video signal provided from a television or external video signal source is processed for recording.

In a conventional home-use video recording/reproducing apparatus, when a video signal is reproduced from a recording medium such as a magnetic tape or is recorded onto a recording medium, the reproducing or recording operation continues for a period of time. The length of the period of time depends on the recording/reproducing speed mode (i.e., SP, LP, SLP etc.) and the tape length, and extends until the end of the tape is detected by an end sensor. The recording/reproducing operation continues regardless of whether or not a video signal is present. Such a needless continuation of the recording/reproducing operation, when no video signal is present, consumes excessive power. Moreover, the friction between the tape and head, as well as other factors, causes unnecessary wear and system fatigue and, thus, shortens the lifetime of the apparatus.

SUMMARY OF THE INVENTION

To solve the above problems, it is an object of the present invention to provide an automatic power-saving circuit which halts a recording or reproducing operation and automatically cuts-off power when an input video signal is determined not to exist and when no input from a function key is received for a predetermined period of time.

Accordingly, to achieve the above object, there is provided an automatic power-saving circuit in a video recording/reproducing apparatus comprising: a key input unit for entering a user command; a power unit for supplying power to each element of the video recording/reproducing apparatus; a pre-amp for amplifying an input video signal and detecting and outputting an envelope of the amplified signal; a video signal discriminator for discriminating the existence of the input video signal from the envelope signal output from the pre-amp and outputting a discrimination signal according to the existence of the video signal; and a microcomputer for controlling the power unit according to the discrimination signal and the user command.

Further, the present invention relates to a method for automatically cutting-off power to a video recording/reproducing apparatus, comprising the steps of: determining if a video signal is present; outputting a cut-off signal if a key input is not present during a predetermined amount of time while said video signal is not present; cutting-off power output from a power unit of the video recording/reproducing apparatus based on the cut-off signal.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
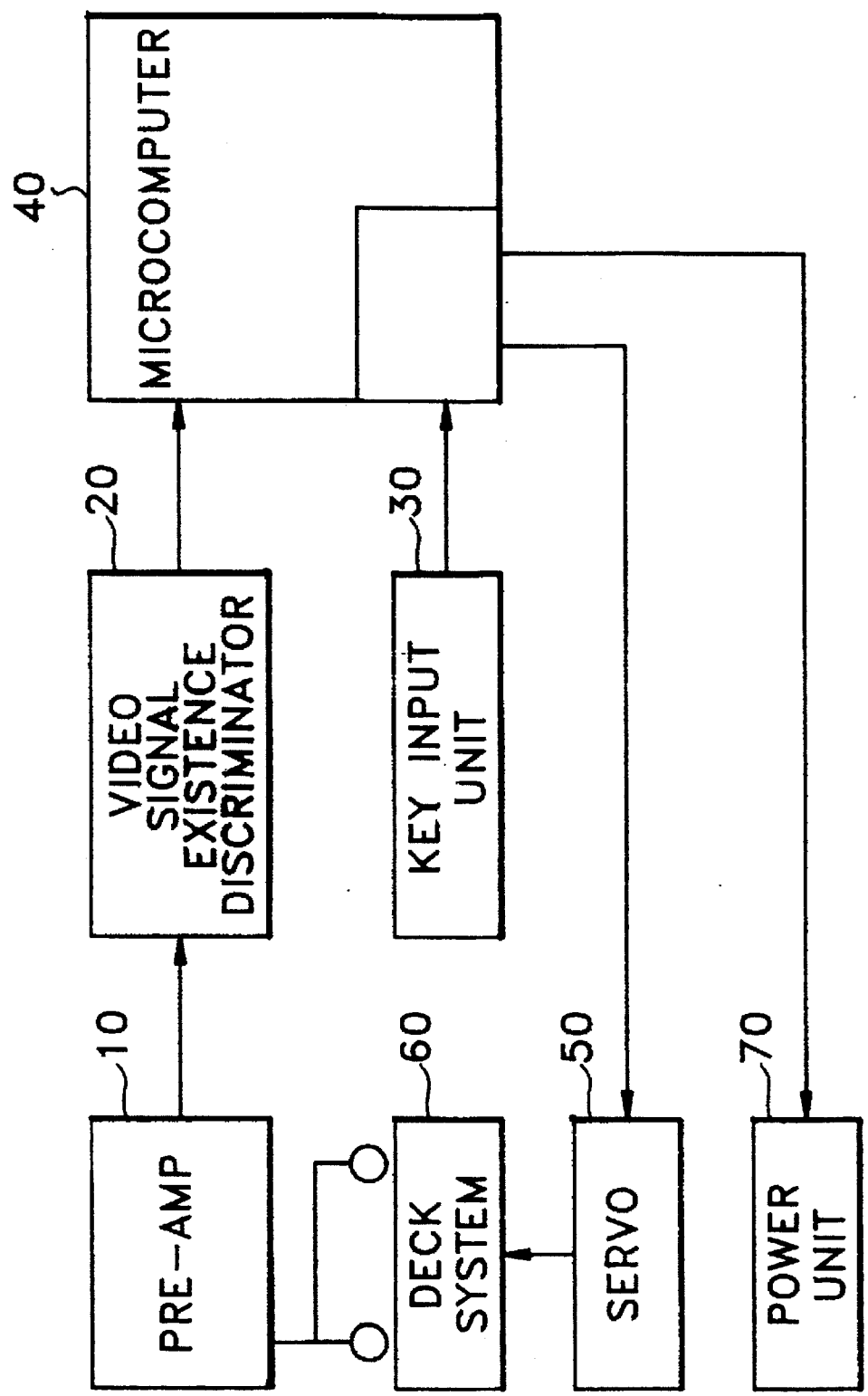
FIG. 1 is a block diagram illustrating an automatic power-saving circuit in a video recording/reproducing apparatus according to the present invention.

FIG. 1 shows an automatic power-saving circuit in a video recording/reproducing apparatus according to the present invention in which the video recording/reproducing apparatus is a videocassette recorder.

The circuit shown in FIG. 1 is comprised of a key input unit 30 for entering user commands and information, a power unit 70 for supplying power to each element of the apparatus, a pre-amp 10 for amplifying a video signal input via deck system 60 and outputting an envelope signal by detecting the envelope of the amplified signal, a video signal existence discriminator 20 for determining the existence of an input video signal based on the envelope signal output from pre-amp 10 and outputting a discrimination signal according to the determination, and a microcomputer 40 for controlling power unit 70 according to the discrimination signal output from video signal discriminator 20 and according to the existence of an input entered via key input unit 30.

Figure 2A:
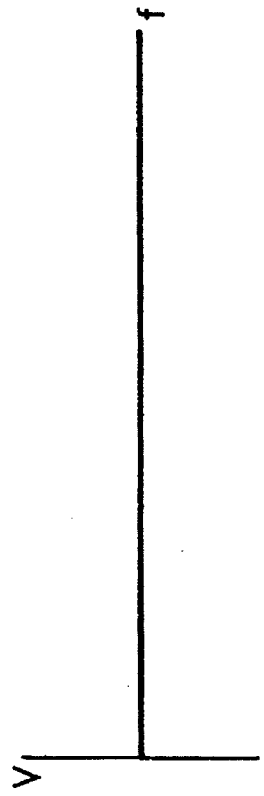
FIGS. 2A and 2B are views showing waveforms of the output signal of the pre-amp shown in FIG. 1.
Figure 2B:
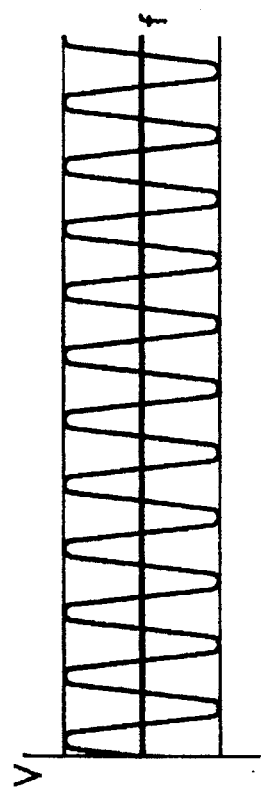

FIG. 2A shows the waveform of an output signal from pre-amp 10 when an input video signal is present at the output of pre-amp 10. FIG. 2B shows the output signal waveform from pre-amp 10 when there is no video signal present.

Figure 3:
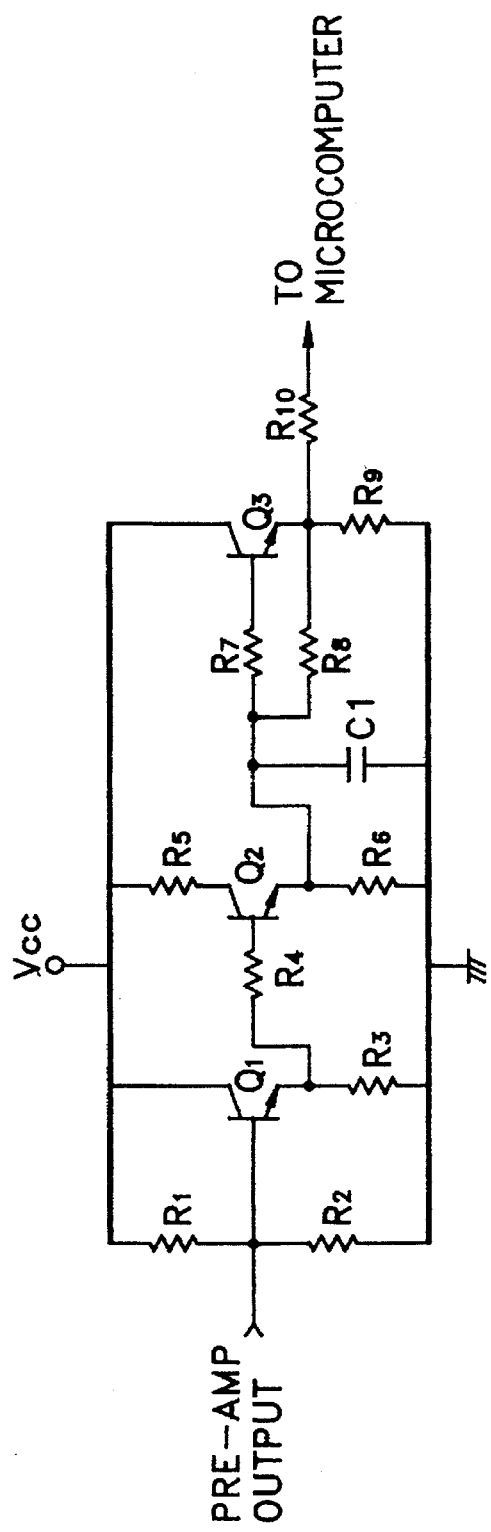
FIG. 3 shows a circuit according to an embodiment of the video signal existence discriminator shown in FIG. 1.

FIG. 3 shows a circuit according to an embodiment of the video signal existence discriminator shown in FIG. 1.

The circuit shown in FIG. 3 is comprised of a transistor $Q_1$ having a base applied with an output signal of pre-amp 10, a collector applied with a power voltage (Vcc), and an emitted connected to ground via a resistor $R_3$. Resistors $R_1$ and $R_2$ are connected to the base of transistor $Q_1$, and act as bias resistors for transistor $Q_1$. The circuit is further comprised of a transistor $Q_2$ having a base and emitter connected, respectively, to the emitter of transistor $Q_1$ via a resistor $R_4$ and to ground via a resistor $R_6$, and a collector which is applied with the power voltage (Vcc) via a resistor $R_5$. The circuit also includes a transistor $Q_3$ having a base and emitter connected, respectively, to the emitter of transistor $Q_2$ via a resistor $R_7$ and to ground via a resistor $R_9$ and whose collector is applied with the power voltage (Vcc). Also, a resistor $R_8$ is connected between the emitters of transistors $Q_2$ and $Q_3$, a capacitor $C_1$ is connected to ground from the emitter of transistor $Q_2$, and a resistor $R_{10}$ is connected between the emitter of transistor $Q_3$ and a first input of microcomputer 40.

Figure 4:
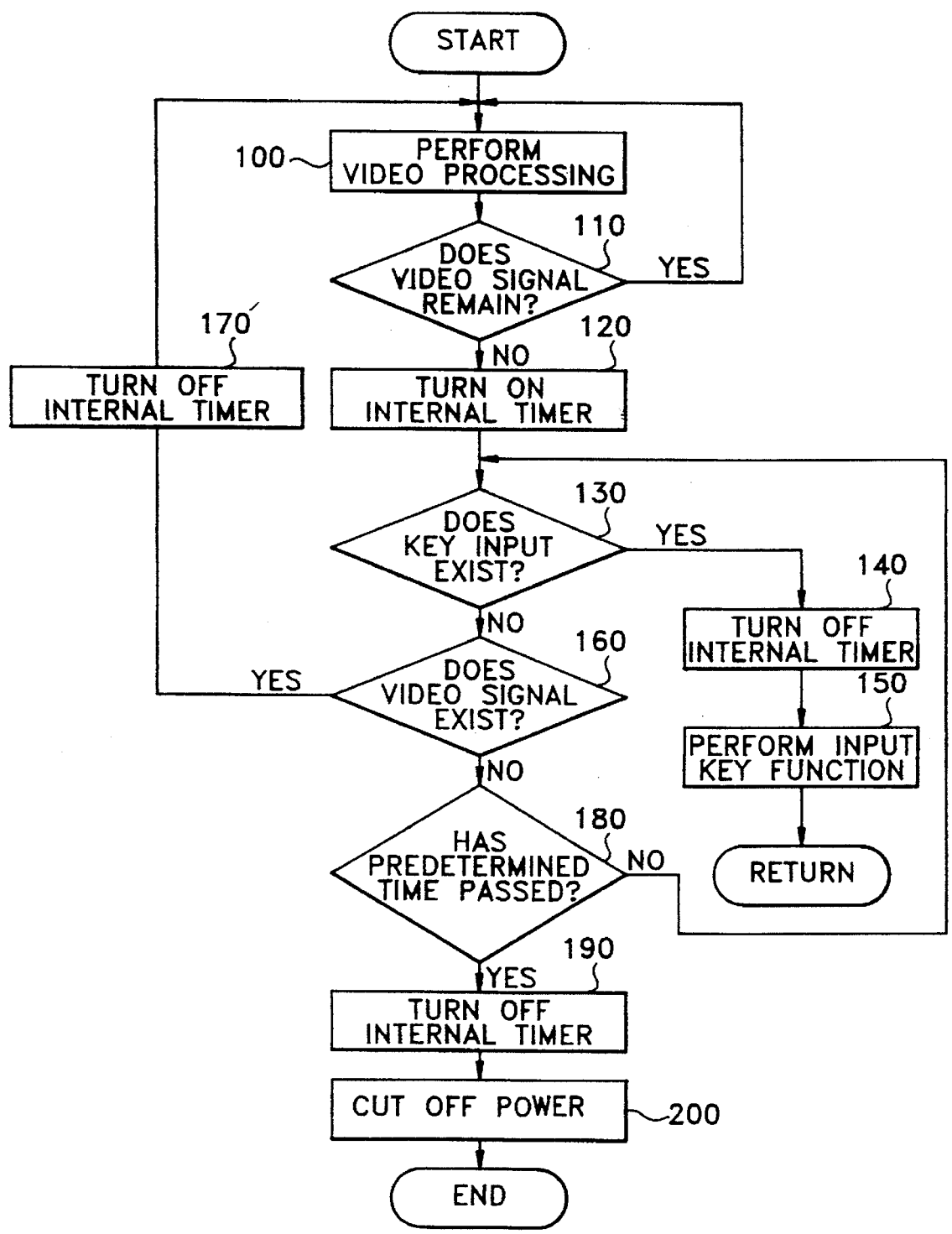
FIG. 4 is a flowchart illustrating the operation of the microcomputer shown in FIG. 1.

FIG. 4 is a flowchart for explaining the operation of microcomputer 40 shown in FIG. 1. Steps 100 to 120 constitute a video signal existence discrimination process for discriminating the existence of a video signal written on a magnetic tape, from an envelope of the video signal reproduced from the magnetic tape. Steps 130 to 150 constitute a key input detection process for detecting the existence of a key input from key input unit 30 and for performing the corresponding function thereof, when it is determined that no video signal is written on the magnetic tape. Steps 160 to 200 comprise an automatic power-saving process for automatically cutting-off power after a predetermined time has elapsed in which no video signal is present.

Operation of the preferred embodiment of the present invention is described in detail as follows, referring to FIGS. 1 to 4.

Pre-amp 10 amplifies a signal reproduced, for example, from a magnetic tape loaded in deck system 60 through a pickup (not shown) during a reproduction operation, and generates and outputs an envelope signal to video signal existence discriminator 20. Pre-amp 10 generates the envelope signal by detecting an envelope of the amplified signal. Here, deck system 60 may be a single or double deck. If an input video signal exists, an envelope signal, as shown in FIG. 2A, for example, is output. If the input video signal does not exist, a "zero" level DC signal as shown in FIG. 2B, is output.

Video signal existence discriminator 20 discerns the existence of an input video signal by referring to the envelope signal output from pre-amp 10. The video signal existence discriminator 20 outputs a logic signal to microcomputer 40 indicating the determined existence of an input video signal.

Next, the operation of video signal existence discriminator 20 is explained in detail, referring to FIG. 3.

Transistor $Q_1$ acts as a buffer and amplifies the voltage and current of the envelope signal output from pre-amp 10, as shown in FIGS. 2A and 2B, and applies the amplified result to the base of transistor $Q_2$ via resistor $R_4$. Here, resistors $R_1$ and $R_2$ operate as biasing transistors. Transistor $Q_2$ amplifies the signal output from transistor $Q_1$ and applies the amplified signal to the base of transistor $Q_3$ via resistor $R_7$. Capacitor $C_1$ integrates the signal output from transistor $Q_2$, to control the switching of transistor $Q_3$. When an envelope signal output from pre-amp 10 exists, the charge current across capacitor C1 switches transistor Q3 to output a logic "high" via its emitter to microcomputer 40. However, when the envelope signal does not exist, transistor $Q_3$ outputs a logic "low" to microcomputer 40

Accordingly, microcomputer 40 controls servo 50 and power unit 70 according to the existence of a video signal and a key input. The operation of microcomputer 40 is explained below with reference to the flowchart shown in FIG. 4.

In step 100, microcomputer 40 sets a video recording/reproducing apparatus into an appropriate mode, such as a recording or reproducing mode. In step 110, the existence of an input video signal is determined by detecting a logic state transition in the output from video signal existence discriminator 20 which is applied to microcomputer 40. If no such signal transition is present in step 110, which implies that a video signal exists, the process returns to step 100 and operation continues. On the other hand, if a transition is detected, which indicates that the input video signal is no longer present, a timer inside microcomputer 40 is started in step 120. The internal timer counts to a predetermined time, irrespective of reproducing speed of the videotape.

In step 130, the existence of input from key input unit 30 is discriminated while the internal timer counts to measure the elapse of the predetermined time, in step 120. When a key input exists, the internal timer is turned off in step 140, and then the function associated with the key input is performed in step 150. If the key input does not exist, the existence of an input video signal is again determined in step 160 by detecting a transition of the output signal of video signal existence discriminator 20. If such a transition is detected in step 160, which indicates that an input video signal now exists, the process returns to step 100, via step 170 where the internal timer is turned off, and the reproducing or recording operation continues. On the other hand, if no such transition is detected, which indicates that the input video signal is still not present, the internal timer is checked in step 180 to determine whether the predetermined time has elapsed, based on the timer's counting. If the predetermined time has not elapsed, the process returns to step 130, and if it has elapsed, the internal timer is turned off in step 190 and power unit 70 cuts-off power in step 200. Here, the predetermined time (for example, three to ten minutes) can be set by the user or preset by the manufacturer.

That is, basically, during a reproducing operation in a videocassette recorder, the end of a video program recorded on a magnetic tape is sensed by detecting an envelope signal output from pre-amp 10, and then, if no user command is input via key input unit 30 for a predetermined period of time, the reproducing operation in the videocassette recorder is halted and power unit 70 is automatically cut-off.

While steps 110 and 160 are described above in terms of detecting a transition in the output of video signal existence discriminator 20, other methods of detecting a change can be used. For example, a particular logic level of the output can be detected to indicate the presence or absence of a video signal, such as a logic "high" indicating that the video signal is present, and a logic "low" indicating that the video signal is not present.

In the aforesaid embodiment, the detailed configuration, operation and effect of an automatic power saving method performed during reproduction in a videocassette recorder are described. However, it is self-evident that the same effect as described above is obtainable whether a recording operation is performed for recording an input video signal supplied from a standard videocassette recorder, camcorder or television, or for recording onto a recording media using one side of a double-deck videocassette recorder.

Also, in the aforesaid embodiment, an envelope signal of a video signal output from a pre-amp is used for detecting the existence of an input video signal. However, in the case of a VHS-type apparatus, a control signal to be recorded on a track or a vertical synchronizing signal or video output signal can be used for such a purpose with the same effect.

As described above, in an automatic power-saving circuit of a video recording/reproducing apparatus according to the present invention, during video processing operations such as recording or reproducing, operation continues if an input video signal is determined to be present by discriminating the existence of an input video signal. If no such input video signal exists and no input from a function key is received for a predetermined period of time, the video processing function is halted and power is automatically cut-off. Therefore, the automatic power-saving circuit has an effect of avoiding unnecessary power consumption and protects against excessive wear of the apparatus.

What is claimed is:

1. An automatic power-saving circuit a video recording/reproducing apparatus comprising:

a key input unit for entering a user command;

a power unit for supplying power to each element of the video recording/reproducing apparatus;

a pre-amp for amplifying an input video signal and detecting and outputting an envelope of the amplified signal;

a video signal discriminator for discriminating the existence of the input video signal from the envelope signal output from said pre-amp and outputting a discrimination signal according to said existence; and a microcomputer for controlling said power unit according to said discrimination signal and said user command.

2. An automatic power-saving circuit according to claim 1, wherein said video signal existence discriminator discerns the existence of an input video signal by discriminating a control signal recorded on a track.

3. An automatic power-saving circuit according to claim 1, wherein said video signal existence discriminator discerns the existence of an input video signal by discriminating a vertical synchronizing signal.

4. An automatic power-saving circuit according to claim 1, wherein said microcomputer halts video processing operations of the video recording/reproducing apparatus and causes said power unit to cut-off power when said video signal existence discriminator discriminates that there is no input video signal present and no user command is input via said key input unit for a predetermined amount of time.

5. An automatic power-saving circuit in a video recording/reproducing apparatus comprising:

a key input unit for entering a user command;

a power unit for supplying power to each element of the video recording/reproducing apparatus;

a pre-amp for amplifying an input video signal and detecting and outputting an envelope of the amplified signal;

a video signal discriminator for discriminating the existence of the input video signal from the envelope signal output from said pre-amp and outputting a discrimination signal according to said existence;

a microcomputer for controlling said power unit according to said discrimination signal and said user command; and wherein said signal discriminator comprises:

a biasing circuit having first and second resistors connected to first and second potentials, respectively;

a first transistor having a base connected to the biasing circuit and receiving the envelope signal output from the pre-amp, a collector connected to the first potential, and an emitter connected to a second potential through a third resistor;

a second transistor having a base connected to the emitter of the first transistor through a fourth resistor, a collector connected to the first potential through a fifth resistor, and an emitter connected to the second potential through a sixth resistor;

a third transistor having a base connected to the emitter of the second transistor through a seventh resistor, a collector connected to the first potential, and an emitter connected to the second potential through a ninth resistor; and an integrating circuit having a capacitor connected between the emitter of the second transistor and the second potential, an eighth resistor connected between the emitter of the second transistor and the emitter of the third transistor, and a tenth resistor having one terminal connected to the emitter of the third transistor and a second terminal supplying the discrimination signal.

6. A method for automatically cutting-off power to a video recording/reproducing apparatus, comprising the steps of:

determining if a video signal is present;

outputting a cut-off signal if a key input is not present during a predetermined amount of time while said video signal is not present; and cutting-off power output from a power unit of the video recording/reproducing apparatus based on the cut-off signal;

wherein said determining step comprises the steps of:
discriminating the presence of an envelope signal output from a pre-amp of the video recording/reproducing apparatus; and outputting a logic signal having a first level if the envelope signal is discriminated, and having a second level if the envelope signal is not discriminated.

7. A method according to claim 6, wherein said step of outputting a cut-off signal comprises the steps of:

detecting a logic signal indicating the absence of the video signal;

starting a counter for determining an elapse of the predetermined period of time upon detecting the logic signal which indicates the absence of the video signal;

detecting a key input; and generating the cut-off signal upon the counter indicating the elapse of the predetermined time period and no key input being detected.

8. A method according to claim 7, wherein said step of detecting the logic signal detects a transition in logic levels of the logic signal to indicate the absence of the video signal.

9. A method according to claim 7, wherein said step of detecting the logic signal detects a logic level of the logic signal to indicate the absence of the video signal.

10. A method according to claim 6, wherein said step of determining if a video signal is present comprises the steps of:

determining if a pre-amp of the video recording/reproducing apparatus outputs an envelope signal; and outputting a logic signal having a logic "high" level if the envelope signal is output.

* * * * *